United States Patent [19]

Griebenow

[11] 3,750,618

[45] Aug. 7, 1973

[54] POSITIONING ARRANGEMENT, ESPECIALLY ADJUSTING THE FEED STROKE OF A TOOL CARRIER IN A MACHINE TOOL

[75] Inventor: Wolfgang Griebenow, Esslingen, Germany

[73] Assignees: Index-Werke K.G.; Hahn & Tessky, Esslingen, Germany

[22] Filed: Apr. 28, 1972

[21] Appl. No.: 248,519

[30] Foreign Application Priority Data
May 7, 1971 Germany .................. P 21 22 691.5

[52] U.S. Cl. ................. 116/115.5, 33/166, 33/170, 82/24, 90/DIG. 12
[51] Int. Cl. ...................................................... B23q
[58] Field of Search ................ 33/DIG. 8, 163, 166, 33/170; 74/804, 805; 90/DIG. 12; 82/34 R, 24 R; 116/115.5

[56] References Cited
UNITED STATES PATENTS

| | | | |
|---|---|---|---|
| 1,939,030 | 12/1933 | Wood | 33/170 |
| 2,777,417 | 1/1957 | Domin | 116/115.5 |
| 3,568,629 | 3/1971 | Porter | 116/124 |

FOREIGN PATENTS OR APPLICATIONS

| | | | |
|---|---|---|---|
| 271,139 | 12/1972 | Austria | 116/115.5 |

*Primary Examiner*—Andrew R. Juhasz
*Assistant Examiner*—W. R. Briggs
*Attorney*—Michael S. Striker

[57] ABSTRACT

A positioning arrangement, especially for adjusting the feed stroke of a tool carrier in a machine tool, in which a scale ring provided with a scale for rough adjustment of the feed stroke cooperates with spindle means turnably mounted in a housing fixed to the tool carrier, provided with a scale for fine adjustment of the feed stroke, and in which a positioning ring provided with a positioning mark is arranged between the two scales. A step down gearing is provided within the rings for driving the scale ring by the spindle means. The step down gearing comprises an internal gear integral with said scale ring and having teeth meshing with the teeth of a gear which is turned by the spindle means.

9 Claims, 4 Drawing Figures

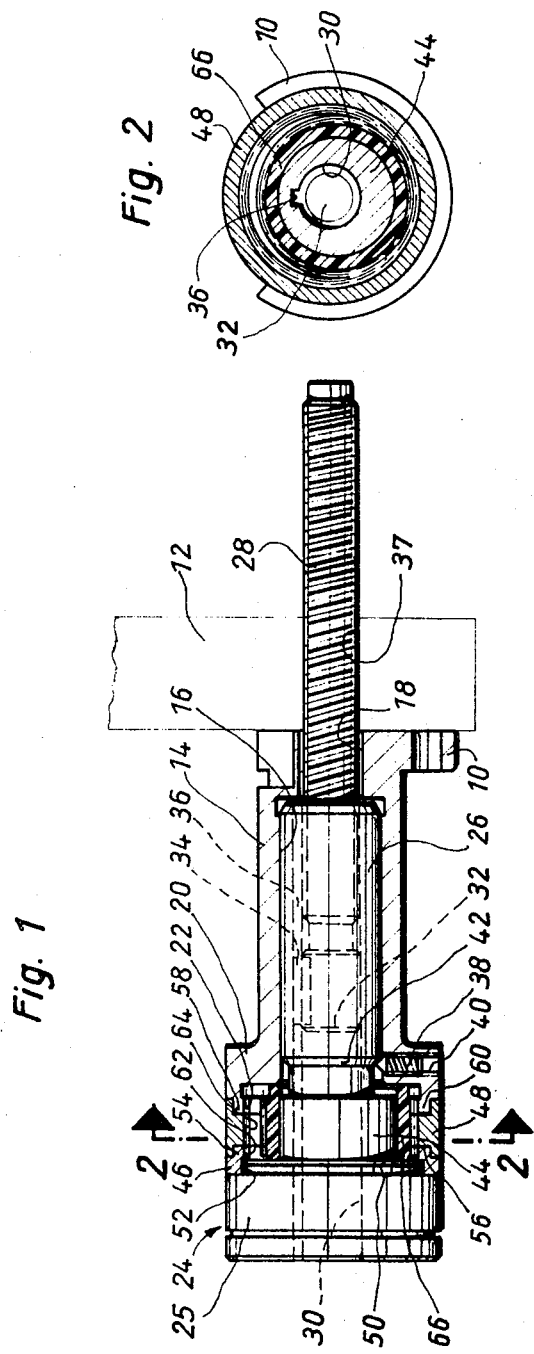

POSITIONING ARRANGEMENT, ESPECIALLY ADJUSTING THE FEED STROKE OF A TOOL CARRIER IN A MACHINE TOOL

BACKGROUND OF THE INVENTION

The present invention relates to a positioning arrangement, especially for adjusting the feed stroke of a tool carrier in a machine tool, in which a scale ring provided with a scale for rough adjustment of the feed stroke cooperates with spindle means provided with a scale for fine adjustment of the feed stroke. The spindle means are turnably mounted in a housing fixed to the tool carrier. A position ring provided with a position mark is arranged between the two scales and a step down gearing is provided within the rings for driving the scale ring by the spindle means. The step down gearing comprises an internal gear integral with the scale ring and having teeth meshing with teeth of a gear which is turned by the spindle means.

In the manufacturer of workpieces in machine tools, especially in automatic screw machines, it is known in the art to provide preadjusted tools in order to reduce the time during set up of the machine as well as during any necessary exchange of tools.

For this purpose, the tool carriers are provided with a positioning arrangement which cooperates with a stop fixed to the machine tool bed or any other stationary part of the machine tool and in which the positioning arrangement may be fine adjusted to thus establish during set up of the machine the feed stroke of the tool carrier and the tool carried thereby.

Various arrangements of this type are known in the art in which by adjustment of the position of a positioning spindle the desired feed stroke, that is the travel of the spindle until its end abuts against the stationary stop is indicated in millimeters or inches and fractions thereof. Such arrangement usually comprises two scale rings which are turned during adjustment of the spindle and which cooperate with a stationary position mark to indicate the set up stroke.

In one construction of this type such a position mark is provided on the free end of stationarily mounted arm which extends over both scales and which is provided with a window in which the staionary mark is located. Such an arm impairs the easy observation of the scales and also obstructs the easy access to the positioning arrangement.

Another construction of this type is also known in the art in which the disadvantages of the above-mentioned construction are avoided by providing the position mark on the circumference of a positioning ring arranged between the scale ring and the scale provided on the spindle means. This positioning ring is fastened to the housing in which the spindle means is turnably mounted and reaches with an annular portion into the scale ring which is driven through a transmission gearing by the spindle means for the rough adjustment of the position of the tool carrier. The transmission gearing comprises in this construction a great number of gears and a correspondingly complicated planetary gear drive for the mounting of which wall portions of the scale ring are formed with corresponding cut outs. Such a construction is for instance shown in the Austrian Pat. No. 271,139 and this construction is extremely complicated and, therefore, expensive.

SUMMARY OF THE INVENTION

It is an object of the present invention to provide a positioning arrangement of the above-described type which avoids the disadvantages of such arrangements known in the art.

It is a further object of the present invention to provide for such a positioning arrangement which is simple in its construction and which can be manufactured at reasonable cost.

With these and other objects in view, the positioning arrangement, according to the present invention, especially for adjusting the feed stroke of a tool carrier of a machine tool, mainly comprises a housing adapted to be connected at one end thereof to the tool carrier and being provided at an end opposite said one end with a first internal gear, tool spindle means comprising an operating member and being mounted in said housing turnable about its axis but immovably in axial direction. The operating member has an end portion located outside said housing and axially spaced from the opposite end thereof, and in the region of the opposite end of the housing, a portion eccentrically arranged with respect to the axis. A positioning spindle is operatively connected to the operating member axially movable with respect thereto during turning of the operating member about its axis and the spindle projects with an end portion thereof beyond said one end of the housing and the tool carrier connected thereto. First scale means for fine adjusting the spindle means are provided on the circumferential surface of the end portion of the operating member. A scale ring coaxial with the aforementioned axis is located adjacent the opposite end of the housing and this scale ring is provided with a second internal gear, and second scale means for rough adjustment of the spindle means are provided on the outer peripheral surface of the scale ring. A positioning ring coaxial with the aforementioned axis is arranged between the scale ring and the end portion of the operating member and provided with a third internal gear and on its outer peripheral surface with a position marker. A single gear ring is arranged about the eccentric portion of the operating member in frictional contact therewith to be rotated about its axis during rotation of the operating member. The gear ring has teeth meshing with the teeth of the first, the second and the third internal gear. The first and the third internal gears having each an equal number of teeth and the number of teeth on the second internal gear differs from that of said first and said third internal gear so that during turning of the spindle means about its axis the gear ring will be rotated and roll off on the stationary internal gear provided on the opposite end of the housing, whereby since the internal gear integral with the positioning ring has the same number of teeth as the internal gear integral with the housing, the positioning ring will remain stationary. The scale ring, however, will be rotated with reduced speed due to the difference of the number of teeth on the internal gear integral with the scale ring and the internal gear integral with the housing. In this connection, it is mentioned that the term "spindle means" as used in the specification and the claims of the present application encompasses a positioning spindle which is turnably mounted on a shaft in the housing and connected at an end thereof with the operating member which on its outer periphery is provided with the aforementioned first scale as well as a positioning spindle which is axially movable with respect to the operating member provided with the first scale but nonrotatably secured to the operating member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an axial cross section of the positioning arrangement according to the present invention;

FIG. 2 is a cross section taken along the line II—II of FIG. 1;

DESCRIPTION OF THE PREFERRED EMBODIMENTS

Figure 3:
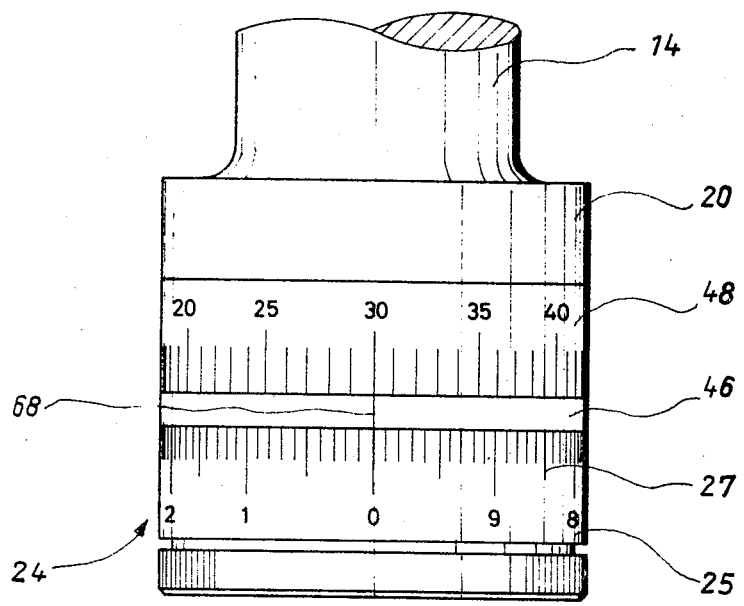
FIG. 3 is a partial side view of the arrangement shown in FIG. 1 and showing the parts provided with scales at an enlarged scale.
Figure 4:
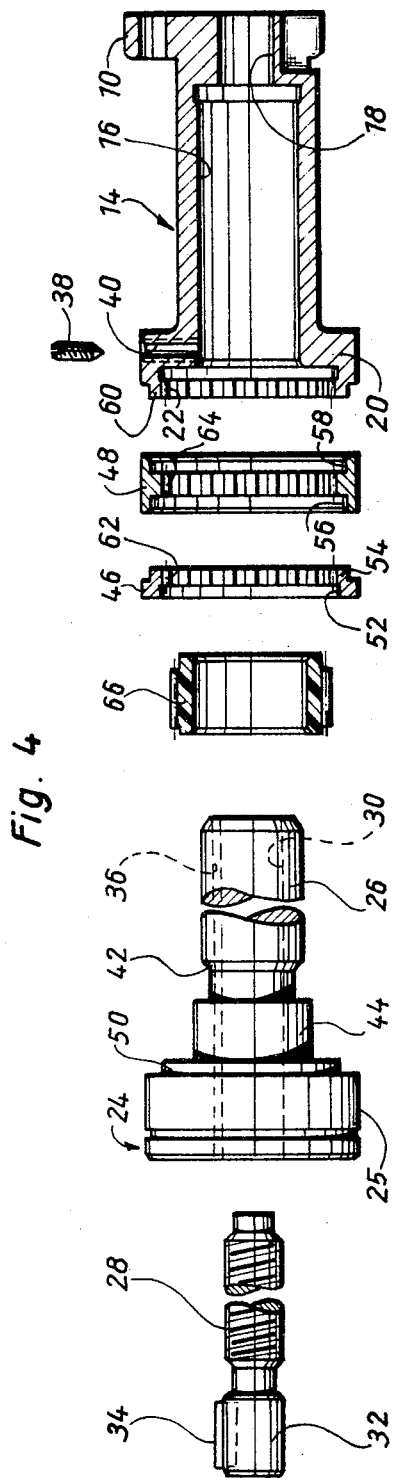
FIG. 4 is an exploded view of the position arrangement shown in FIG. 1.

The positioning arrangement illustrated in the drawing comprises a housing 14 provided at one end thereof abutting against a tool carrier 12, schematically indicated in FIG. 1, with a flange 10 formed with openings therethrough for fastening members such as screws or the like, not shown in the drawing, by means of which the housing 14 may be connected to the tool carrier 12. The substantially cylindrical housing 14 is provided with a stepped axial bore therethrough which has at the end of the housing abutting against the tool carrier 12a portion 18 of a diameter smaller and, at the opposite enlarged diameter portion 20 of the housing, a portion of larger diameter than the remainder 16 of the bore. The end portion 20 of enlarged diameter is integrally formed with a first internal gear 22.

Tool spindle means comprising an operating member 24 and a positioning spindle 28 operatively connected to the operating member are mounted in the bore of the housing. The operating member 24 has a shaft portion 26 turnably mounted in the bore portion 16 of the housing, and an end portion 25 of a diameter greater than the shaft portion, located outside of the housing and axially spaced from the housing 20. As shown in FIG. 3, the end portion 25 of the operating member is provided on its outer circumferential surface with a first scale 27 for fine adjustment of the positioning spindle 28. The positioning spindle 28 has a cylindrical end portion 32 axially movable in a bore 30 extending coaxially through the operating member 24 while a key 34 fixed to the end portion of the positioning spindle 28 located in the bore 30 engages in a longitudinal extending groove of the bore 30 to thus prevent rotation of the spindle 28 relative to the operating member 24. The positioning spindle 28 projects with a portion thereof provided with an external screw thread with clearance through the bore portion 18 and is threadingly engaged with an internal screw thread 37 provided in a bore of the tool carrier 12 so that during rotation of the operating member the position of the free end of the tool spindle 28 located beyond the tool carrier 12, may be axially adjusted relative to the tool carrier 12. A set screw 38 screwed into a radially extending tapped bore 40 provided in the housing end portion 20 engages with its pointed inner end an inclined annular surface 42 at the left end, as viewed in FIG. 1, of the shaft portion 26 to fix the axial position of the operating member 24 relative to the housing 14 and to adjust any radial clearance between the shaft portion 26 and the bore portion 16 of the housing.

The operating member 24 has between the end portion 25 and the adjacent end of the shaft portion 26 a portion 44 of a diameter slightly greater than the diameter of the shaft portion 26 and eccentrically arranged with respect to the axis of the operating member. The eccentrically formed cylindrical portion 44 is arranged at a certain distance from the aforementioned end of the shaft portion.

A positioning ring 46 and a scale ring 48 for the rough adjustment of the positioning spindle 28 are arranged, as clearly shown in FIG. 1, between the large diameter end portion 20 of the housing and the end portion 25 of the operating member 24. The rings 46 and 48 are coaxially arranged with the end portion 25 of the operating member 24 and the end portion 20 of the housing 14, and the two rings as well as the two end portions have equal outer diameters. To maintain the two rings coaxial with the aforementioned two end portions, the end portion 25 of the positioning member is provided on its end face facing the end portion 20 of the housing with an annular portion 50 of reduced diameter and the positioning ring 46 is provided in the face thereof facing the end portion 25 with a corresponding annular cutout 52 in which the cylindrical portion 50 of the end portion 25 is received. On its opposite end face, the positioning ring is provided with a cylindrical portion 54 of reduced diameter which engages in a corresponding annular cut-out 56 of the scale ring 48, which on its opposite end face is provided with a similar annular cut-out 58 which receives a cylindrical portion 60 of reduced diameter projecting from the adjacent end face of the end portion 20 of the housing. Thus, the elements 25, 46 and 48 may be turned relative to each other while being maintained coaxially with each other. The scale ring 48 is provided with a second internal gear 64 integral therewith and the positioning ring 46 is provided with a third internal gear 62 integral therewith. While the number of teeth on the first and third internal gear 22 and 62 are equal, the number of the teeth on the internal gear 64 integral with the scale ring 48 differs from the number of teeth on the two other gears.

The arrangement includes further a single gear ring 66, preferably made from plastic material, about the eccentric portion 44 of the operating member 24 in frictional engagement with the outer peripheral surface of the eccentric portion. The axial length of the gear ring 66 is such that its radially outwardly projecting teeth will be in meshing engagement with the teeth of the internal gears 22, 62 and 64.

As further shown in FIG. 3, the positioning ring 46 is provided on its circumferential surface with a linear position mark 68 extending in axial direction between the scale 27 and the scale provided on the scale ring 48.

The spacing of the graduations provided on the scale ring 48 will depend on the maximum feed stroke of the tool carrier 12 which is to be determined by the position of spindle 28, that is if for instance a maximum feed stroke of 100 millimeters is available, then the scale on the scale ring 48 for indicating the rough adjustment of the positioning spindle is to be divided in 100 equal parts so that adjustment of the scale ring through an angle corresponding to the distance between two adjacent scale lines will correspond to a feed stroke of a millimeter. of course, it is also possible to adjust with and read on the thus formed scale a greater feed stroke than 100 millimeters in which case the scale should be provided with a double scale numbering.

The scale 27 provided on the end portion 25 of the operating member 24 is provided to adjust the position of the spindle 28 for fractions of millimeters. The division of the scale 27 will depend on the pitch of the screw thread on the positioning spindle 28. Assuming that the pitch is 1 millimeter, then the scale 27 is to be divided in 100 equal parts to indicate an adjustment of a hundredth of a millimeter on the scale. In this arrangement it is necessary that the difference between the number of the teeth on the internal gears 22 and 62 and that on the internal gears 64 integral with the scale ring 48 is such that during turning of the operating member 24 through one revolution, the scale ring 48 is turned by means of the gearing 66 through an angle which corresponds to the axial adjustment of the positioning spindle for 1 millimeter. For this purpose, the number of teeth of the internal gear 64 integral with the scale ring 48 has to correspond in the specific arrangement described to the number of division lines provided on the scale ring 48, that is the internal gear 64 will have 100 teeth.

In order to obtain the desired turning angle of the scale ring during each full revolution of the operating member 24, the internal gears 22 and 62 are provided with one tooth more, that is with 101 teeth respectively or one teeth less, that is 99 teeth, corresponding to the desired direction of rotation of the scale ring 48.

If the operating member 24 is turned by manually gripping the end portion 25 thereof, then the eccentrically arranged cylindrical portion 44 will cause the gear ring 66 to roll off on the stationary internal gear ring 22 of the housing 14. The gear ring 66 during its rotation will thereby during each revolution turn the scale ring 48 through one tooth respectively through an angle corresponding to two adjacent lines of the scale provided thereon due to the difference of the number of teeth provided on the internal gear ring integral with the scale ring and that of the internal gear ring integral with the housing end portion 20. The position of the positioning ring 46 will, during turning of the operating member 24, remain stationary due to the equal number of teeth of the internal gear 22 integral with the housing end portion 20 and that of the internal gear 62 integral with the positioning ring 46.

It will be understood that each of the elements described above, or two or more together, may also find a useful application in other types of positioning arrangements differing from the types described above.

While the invention has been illustrated and described as embodied in a positioning arrangement, especially for adjusting the feed stroke of a tool carrier of a machine tool, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoit of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A positioning arrangement, especially for adjusting the feed stroke of a tool carrier of a machine tool, comprising a housing adapted to be connected at one end thereof to the tool carrier and being provided at an end opposite said one end with a first internal gear; tool spindle means comprisng an operating member having an axis and being mounted in said housing turnably about said axis and immovably in axial direction, said operating member having an end portion located outside said housing and axially spaced from said opposite end thereof and having in the region of said opposite end of said housing a portion eccentrically arranged with respect to said axis, and a positioning spindle operatively connected to said operating member axially movable with respect thereto during turning of said operating member about said axis, said positioning spindle projecting with an end portion thereof beyond said one end of said housing and the tool carrier connected thereto; first scale means for fine adjustment of said positioning spindle on the circumferential surface of said end portion of said operating member; a scale ring coaxial with said axis and adjacent said opposite end of said housing, said scale ring being provided with a second internal gear; second scale means for rough adjustment of said positioning spindle provided on the outer peripheral surface of said scale ring; a position ring coaxial with said axis between said scale ring and said end portion of said operating member and provided with a third internal gear; a position mark on the outer peripheral surface of said position ring; a single gear ring about said eccentric portion of said operating member in frictional engagement with the peripheral surface thereof to be rotated about its axis during rotation of said operating member, said gear ring having teeth meshing with the teeth of said first, said second and said third internal gear, said first and said third internal gear having an equal number of teeth and the number of teeth on said second internal gear differs from that of said first and second internal gears so that during turning of said operating member about its axis said position ring will remain stationary while said scale ring will be rotated in dependence on the difference of the number of teeth on said first and said second internal gears.

2. A positioning arrangement as defined in claim 1, wherein each of the scale means has 100 divisions and wherein the number of teeth of said second internal gear differs by one tooth from the number of teeth on said first internal gear.

3. A positioning arrangement as defined in claim 1, wherein said housing is formed with a stepped cylindrical bore having at said one end a portion of smaller and at the opposite end a portion of larger diameter than the remainder of said bore, said operating member being mounted in the remainder of said bore for turning movement about its axis and being formed with a bore therethrough coaxial with said stepped bore, said positioning spindle having a portion slidably arranged in said bore of said operating member and extending through said small diameter bore portion and through a bore in said tool carrier, said spindle being provided with an external screw thread meshing with an internal screw thread provided in said bore of the tool carrier, and including cooperating means on said operating member and said spindle for preventing rotation of said spindle relative to said operating member while permitting said spindle to move axially relative to said operating member.

4. A positioning arrangement as defined in claim 1, wherein said end portion of said operating member, said scale ring and said positioning ring have equal outer diameters.

5. A positioning arrangement as defined in claim 4, wherein said opposite end of said housing and said end portion of said operating member have cylindrical portions of reduced diameters facing each other on which portions of said scale ring and said positioning ring of corresponding diameters are respectively mounted for keeping said rings coaxially with the axis of said operating member.

6. A positioning arrangement as defined in claim 5, wherein said scale ring and said positioning ring are provided on end faces thereof facing each other with inter-engaging annular portions.

7. A positioning arrangement as defined in claim 1, wherein said single gear is made from plastic material.

8. A positioning arrangement as defined in claim 3, and including releasable means cooperating with said housing and said operating member for holding the latter in a fixed axial position in said bore of said housing.

9. A positioning arrangement as defined in claim 1, wherein said housing is provided at said one end thereof with a flange formed with openings therethrough for fastening said housing to said tool carrier.

* * * * *